(12) United States Patent
Maeda et al.

(10) Patent No.: US 10,131,081 B2
(45) Date of Patent: Nov. 20, 2018

(54) HEATER, RESIN MOLDING APPARATUS, RESIN MOLDING METHOD AND RESIN MOLDED BODY

(75) Inventors: Mitsuo Maeda, Tokyo (JP); Yasuo Matsumi, Machelen (BE)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1614 days.

(21) Appl. No.: 12/918,569

(22) PCT Filed: Feb. 19, 2009

(86) PCT No.: PCT/JP2009/052893
§ 371 (c)(1),
(2), (4) Date: Nov. 4, 2010

(87) PCT Pub. No.: WO2009/104678
PCT Pub. Date: Aug. 27, 2009

(65) Prior Publication Data
US 2011/0036833 A1 Feb. 17, 2011

(30) Foreign Application Priority Data
Feb. 20, 2008 (JP) ................................. 2008-039071

(51) Int. Cl.
*H05B 6/10* (2006.01)
*B29C 33/02* (2006.01)
(Continued)

(52) U.S. Cl.
CPC ...... *B29C 45/7312* (2013.01); *B29C 45/2737* (2013.01); *B29C 45/78* (2013.01); *B29C 33/06* (2013.01); *B29C 45/14655* (2013.01)

(58) Field of Classification Search
CPC ............. B29C 33/06; B29C 45/14655; B29C 45/2737; B29C 45/7312; B29C 45/78;
(Continued)

(56) References Cited

U.S. PATENT DOCUMENTS 4,678,421 A * 7/1987 Kai .................. B29C 43/34
264/328.11
4,726,751 A * 2/1988 Shibata et al. ............... 425/144
(Continued)

FOREIGN PATENT DOCUMENTS

CN 1543264 A 11/2004
CN 1796104 A 7/2006
(Continued)

OTHER PUBLICATIONS

International Search Report dated May 19, 2009 in International Application No. PCT/JP2009/052893.
(Continued)

*Primary Examiner* — Tu B Hoang
*Assistant Examiner* — Diallo I Duniver
(74) *Attorney, Agent, or Firm* — Panitch Schwarze Belisario & Nadel LLP

(57) ABSTRACT

Because it is possible to cool down a column member at a higher speed than natural cooling, throughput can be improved further. Especially, when the tubular body M42 and the column part M43 are made of different metals and the column part M43 is pressed into the tubular body M42, a distortion will occur in the column member M42 and M43 and the top board M41 fixed to the column member M42 and M43 due to the difference in thermal expansion coefficients between them, but the cooling paths P1 and P2 can absorb a distortion caused by the difference in thermal expansion coefficients of these metals. In particular, when the top board M41 is used as a mold for resin molding, it is possible to perform resin molding precisely because distortion caused by the difference in thermal expansion coefficients does not easily occur.

6 Claims, 13 Drawing Sheets

(51) Int. Cl.
*B29C 45/73* (2006.01)
*B29C 45/27* (2006.01)
*B29C 45/78* (2006.01)
*B29C 33/06* (2006.01)
*B29C 45/14* (2006.01)

(58) Field of Classification Search
CPC ............ B29C 33/065; B29C 45/14663; B29C 45/14672; B29C 45/2753; B29C 45/2738; B29C 45/7325
USPC ....... 219/672, 674–677; 264/328.16, 328.14, 264/328.15; 425/470–471
See application file for complete search history.

(56) References Cited

U.S. PATENT DOCUMENTS

| | | | | |
|---|---|---|---|---|
| 5,474,439 | A * | 12/1995 | McGrevy | B29C 45/2735 264/328.15 |
| 6,043,466 | A * | 3/2000 | Jenko | B29C 45/1782 138/33 |
| 2004/0037913 | A1* | 2/2004 | Gellert et al. | 425/549 |
| 2006/0141275 | A1 | 6/2006 | Yamashita et al. | |

FOREIGN PATENT DOCUMENTS

| | | |
|---|---|---|
| EP | 1467598 A2 | 10/2004 |
| JP | 02-182433 A | 7/1990 |
| JP | 04006124 A | 1/1992 |
| JP | 7125057 A | 5/1995 |
| JP | 7304076 A | 11/1995 |
| JP | 8080532 A | 3/1996 |
| JP | 2001-113580 A | 4/2001 |
| JP | 2001-210457 A | 8/2001 |
| JP | 2004-249681 A | 9/2004 |
| JP | 2005-281053 A | 10/2005 |
| TW | 505616 B | 10/2002 |

OTHER PUBLICATIONS

Office Action dated Apr. 25, 2013 in CN Application No. 200980105867.0.

Office Action dated Apr. 2, 2013 in JP Application No. 2009-036484.

Office Action dated Oct. 10, 2012 in CN Application No. 200980105867.0.

Int'l. Preliminary Report on Patentability and Written Opinion dated Oct. 5, 2010 in Int'l. Application No. PCT/JP2009/052893.

Office Action dated Sep. 1, 2014 in KR Application No. 2010-7020731.

Office Action dated Oct. 22, 2014 in TW Application No. 098105471.

* cited by examiner

HEATER, RESIN MOLDING APPARATUS, RESIN MOLDING METHOD AND RESIN MOLDED BODY

CROSS-REFERENCE TO RELATED APPLICATION

This application is a section 371 of International Application No. PCT/JP2009/052893, filed Feb. 19, 2009, which was published in the Japanese language on Aug. 27, 2009 under International Publication No. WO 2009/104678 A1 and the disclosure of which is incorporated herein by reference.

TECHNICAL FIELD

The present invention relates to a heater, a resin molding apparatus, a resin molding method and a resin molded body which can improve manufacturing throughput by performing heating and cooling at a high speed.

BACKGROUND ART

In the prior art resin molding, temperature of a mold is increased, a resin is injected in the mold and the solidified resin is taken out from the mold after the mold is cooled down. As such a technology, a technology described in Patent Literature 1 is known, for example. In this technology, a coil is buried within a mold, and the mold is heated by energization of the coil.
Patent Literature 1: Japanese Unexamined Patent Application Publication No. Hei-7-125057

SUMMARY OF INVENTION

Technical Problem

However, in a heater of the related art, there is a problem that it is not possible to perform heating and/or cooling at a high speed, and thus manufacturing throughput is low. The present invention is made in view of such a problem, and its object is to provide a heater, a resin molding apparatus and a resin molding method capable of improving manufacturing throughput, and a resin molded body which is manufactured thus.

Solution to Problem

In order to solve the above mentioned problem, a heater according to the present invention includes a top board made of metal, a column member which is made of metal and provided on the top board and a coil surrounding the column member relative to the axis thereof, wherein the column member includes a cooling path in its interior.

When the coil is energized, an electric current passes through the surface of the column member to cause high-frequency induction heating, and the heat is transferred to the top board that is thermally connected to the column member. Because this heating is high-frequency induction heating, it is possible to increase temperature of the top board at a high speed. On the other hand, the column member has the cooling path in its interior. A cooling medium such as air, water, mist air and frozen air can be flowed through the cooling path. Because, in this way, the column member can be cooled at a higher speed than that of natural cooling, throughput of a manufacturing process which has a cycle of heating and cooling can be increased.

It is preferred that the thermal conductivity of the top board is higher than that of areas of the column member neighboring the coil.

Although the areas of the column member neighboring the coil need a certain level of high resistance in order to perform high-frequency induction heating, a material of a high resistance usually has a low thermal conductivity and thus it is difficult to increase the temperature of the top board efficiently. To cope with this, in the present invention, because the thermal conductivity of the top board is arranged to be relatively high, the rate of temperature increase in the top board is improved and thus the manufacturing throughput of a material which is heat-treated on the top board is improved. This material preferably is a resin.

The column member includes a tubular body made of a first metal and a column part which is made of a second metal and provided in the tubular body, and the thermal conductivity of the second metal is preferably higher than that of the first metal. Meanwhile, the thermal conductivity cited herein represents thermal conductivity at a measurement temperature of 20° C. unless otherwise stated. By using such column member, because the thermal conductivity of the column part within the tubular body is high, heat generated in the tubular body will be conducted to the top board effectively via the column part. It is also effective for radiating heat of the top board via the column part.

In a case where the column member or the column part has a cooling path, when the tubular body and the column part are made of different metals and the column part is press-fitted into the tubular body, a distortion will occur in the column member and the top board fixed to the column member due to the difference in thermal expansion coefficients between them, but the cooling path can absorb a distortion caused by the difference in thermal expansion coefficients between these metals. In particular, when the top board is used as a mold for resin molding, it becomes possible to perform resin molding precisely because a distortion caused by the difference in thermal expansion coefficients does not easily occur.

In addition, it is preferred that the thermal conductivity of the first metal is 60 W/m·K or less and the thermal conductivity of the second metal is 70 W/m·K or more, and in this case, the top board can be heated and/or cooled at a sufficiently high speed.

A resin molding apparatus according to the present invention is provided with a recessed pattern for resin molding in the above mentioned top board of the heater. In this case, resin molding is made along the recessed pattern. Because the top board is heated and/or cooled at a high speed, it is possible to improve throughput at the time of resin molding.

A resin molding method according to the present invention includes: a step of injecting a resin into a mold of the above mentioned resin molding apparatus including a recessed pattern; and a step of cooling the mold, wherein the resin is a thermoplastic resin, wherein a coil is energized, and when a temperature of the mold when injecting the resin into the mold is T1 (° C.) and a flow starting temperature of the resin is T2 (° C.), the following expression is satisfied:

$$T1(° C.) \geq T2(° C.) - 70° C.$$

When a resin is injected at such temperature, the resin sufficiently flows within the mold and a resin molded body of a fine appearance can be formed.

Specifically, a resin molding method according to the present invention includes: a step of inserting an insert part to a mold of the above mentioned resin molding apparatus including a recessed pattern; a step of injecting a resin into the mold; and a step of cooling the mold, wherein the resin is a thermoplastic resin, wherein a coil is energized, and when a temperature of the mold when injecting the resin into the mold is T1 (° C.) and a flow starting temperature of the resin is T2 (° C.), the following expression is satisfied:

$$T1(° C.) \geq T2(° C.) - 70° C.$$

That is, even when a resin is injected at such temperature after an insert part such as a lead frame is inserted in advance of injecting the resin, the resin sufficiently flows within the mold and a resin molded body of a fine appearance can be formed.

Among others, it is preferable that the thermoplastic resin is a liquid crystalline polymer, and a liquid crystalline polymer can flow within a mold sufficiently. In comparison with a resin molded body manufactured by an existing method, a resin molded body manufactured by the above mentioned resin molding method has a difference that, in terms of its structure, it has a superior appearance having few welds which are caused by resin flows running into each other and an extremely small flow mark and so on. Moreover, it also has an advantage that, when a resin is injected into a mold which sandwiches a lead frame (into which a lead frame is inserted) at a relatively high temperature, the adhesiveness between the lead frame and the resin is improved.

When a lead frame or the like is used as an insert part in this way, a resin molded body in which the insert part and a resin is unified is obtained, it is preferred that blackening treatment or roughening treatment is applied to such an insert part. When an insert part to which such treatment is applied is used, there is a tendency that the adhesiveness between the insert part and the resin is further improved.

Advantageous Effects of Invention

By a heater of the present invention, manufacturing throughput is improved, and by a resin molding apparatus and a resin molding method using it, resin molding can be performed at a high throughput. In addition, a resin molded body molded from a resin injected at a high temperature will be superior in its appearance.

REFERENCE SIGNS LIST

M41 Top board
M42 Tubular body (column member)
M43 Column part (column member)
WR Coil
P1, P2 Cooling path

DESCRIPTION OF EMBODIMENTS

Hereinafter, a heater, a resin molding apparatus, a resin molding method and a resin molded body according to an embodiment will be described. In the following description, the same components are denoted by the same symbols, and overlapped description thereof will be omitted.

Figure 1:
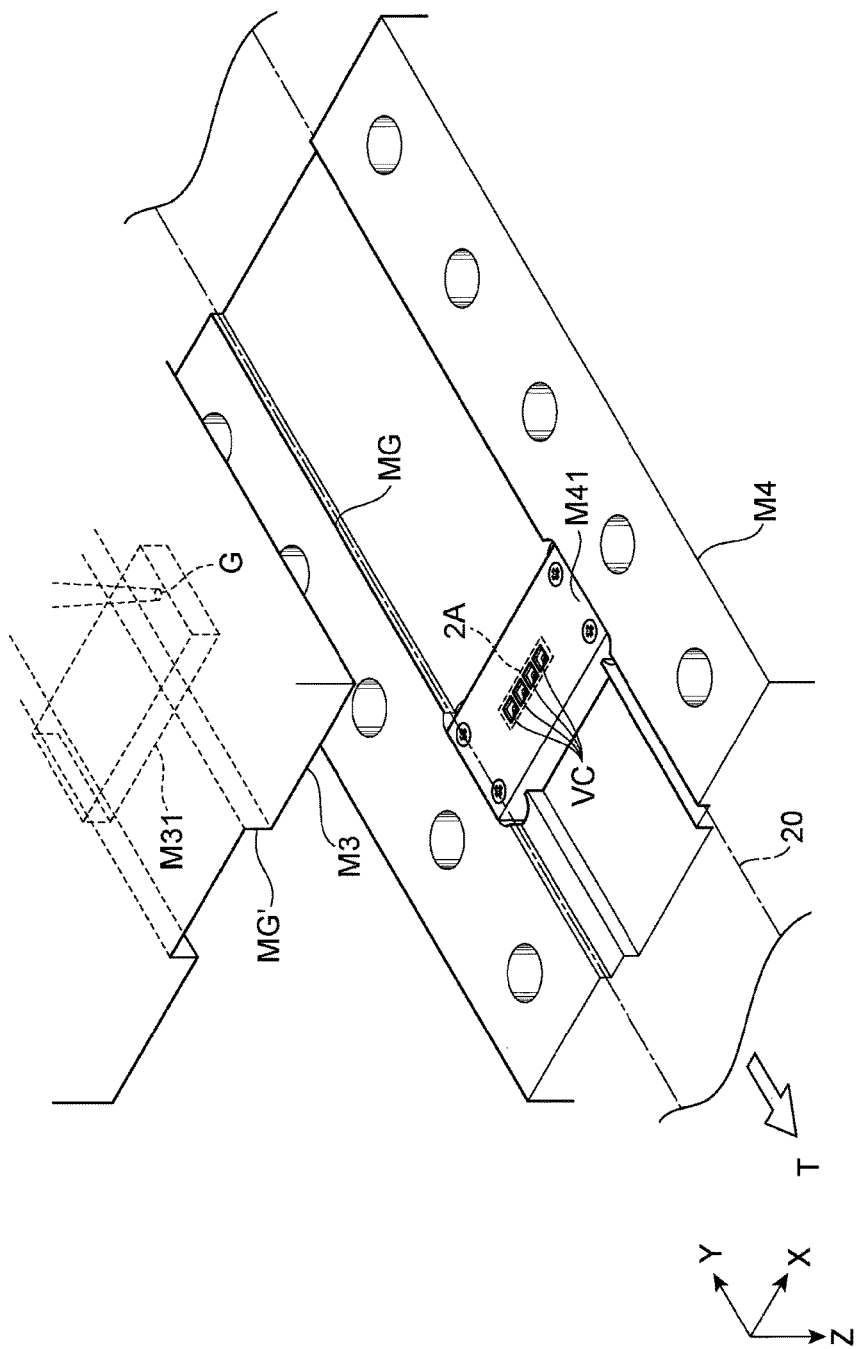
FIG. 1 is a perspective view of major portions of a resin molding apparatus.

FIG. 1 is a perspective view of major portions of a resin molding apparatus.

In the following, using a resin molding apparatus of FIG. 1, resin molding in the case of using a lead frame as an insert part, in particular, a lead frame made of metal, will be described.

In the resin molding, first, a lead frame 20 is provided. One lead frame 20 has a plurality of areas for forming a plurality of cases. A lower mold M4 includes a groove MG for conveying the lead frame 20, and a major portion of lower mold (a top board) M41 is fixed in the groove MG of the lower mold M4. Over the lower mold M4, an upper mold M3 is arranged, and in a position facing the lower mold major portion M41 an upper mold major portion M31 is positioned. A resin is injected into a cavity between these mold major portions M31 and M41, and resin molding is performed.

The depth of the groove MG in the ejection side in a conveying direction T of the lead frame 20 is deeper than that of the insertion side of the lead frame 20, and it is configured such that even a resin after molding can fit in the groove MG. Meanwhile, also in the upper mold M3, a groove MG' is formed in the area in the lead frame ejection side more downstream than the upper mold major portion M31.

Particularly, after one area for resin molding of the lead frame 20 is positioned at a position between the mold major portions M31 and M41, the mold major portions M31 and M41 close along with the molds M3 and M4. After that, a melted resin is filled into a space sandwiched by the molds via a resin filling opening (gate) G provided in the upper mold major portion M31, and molding is performed. The number of the gate G may be more than one. Meanwhile, from just before the injection until just after completion of the injection, air existing within the cavity of the mold major portions M31 and M41 is exhausted to the outside via an exhaust opening VC provided in the upper mold major portion M31 and/or the lower mold major portion M41. That is, a recessed pattern 2A and the exhaust opening VC are in communication with each other even in the state where the molds are closed. In this regard, however, because the above mentioned resin which has been melted (molten resin) is of a relatively high viscosity, the molten resin is not sucked from a gap of the areas between the molds which are in communication with each other into the exhaust opening VC, and the size of the gap at this time may be determined taking the viscosity of the molten resin into consideration.

Although the recessed pattern 2A for resin molding is formed on the surface of each of the mold major portions M31 and M41, because the shape of the recessed pattern 2A and the shape of the case body of the molded resin are identical, it is indicated here as a single or a plurality of resin case bodies (2A).

After resin molding, the upper and lower molds M3 and M4 are opened, the molded case bodies (2A) move toward the large-depth side of the groove MG, and the next resin molding area of the lead frame is placed between the mold major portions M31 and M41 again.

That is, this method of manufacturing a resin case includes: a step for providing a lead frame 20; a step for placing the lead frame 20 within a space sandwiched by the opposed two molds (major portions) M31 and M41; and a step of injecting a resin into the space.

Figure 2:
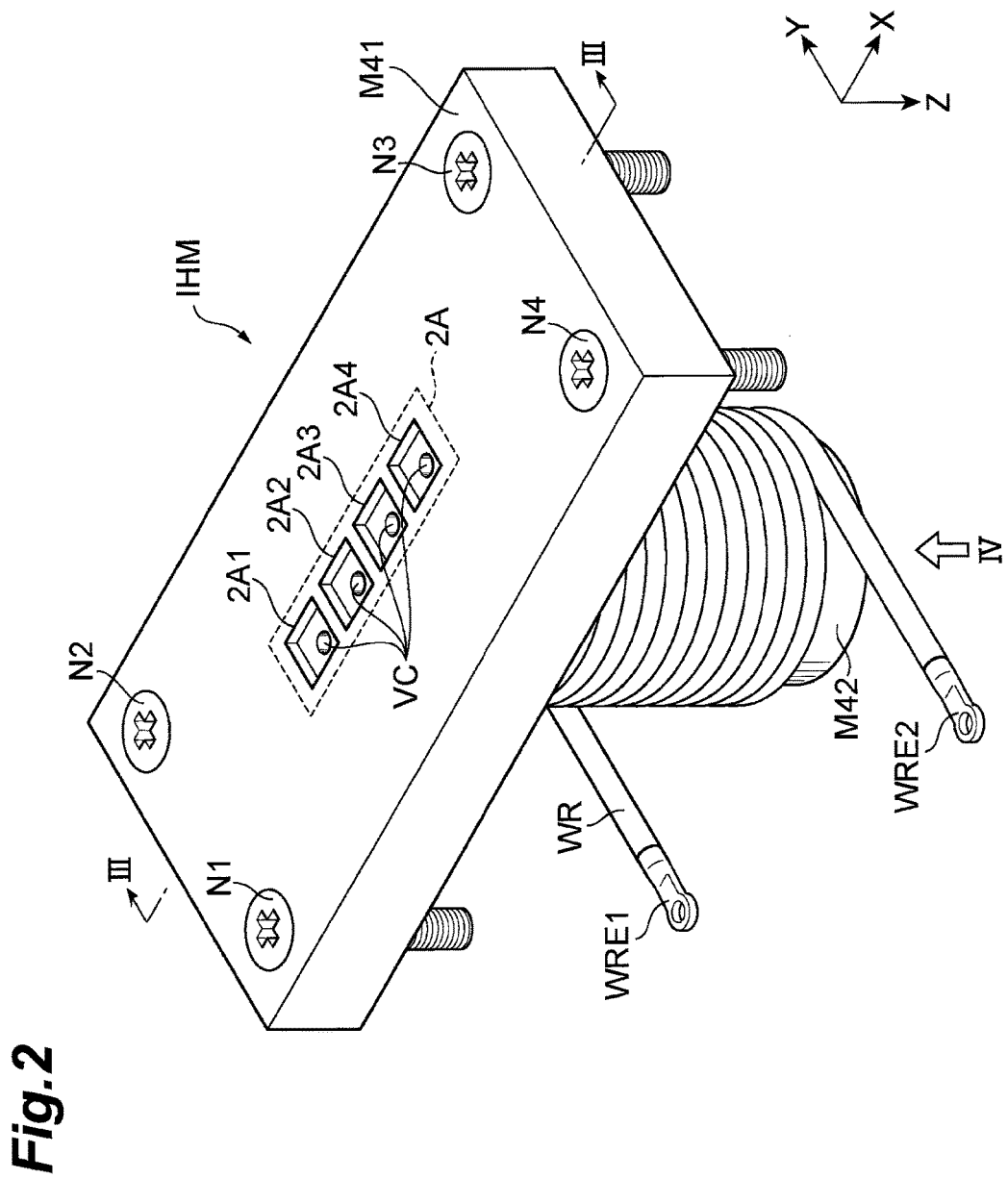
FIG. 2 is a perspective view of a heater.

Here, the lower mold major portion M41 constitutes the top board (M41) of a heater IHM shown in FIG. 2. If XYZ orthogonal coordinate system is set, the surface of the top board M41 corresponds to a X-Y plane, and the exhaust opening VC extends along the Z axis direction.

Figure 3:
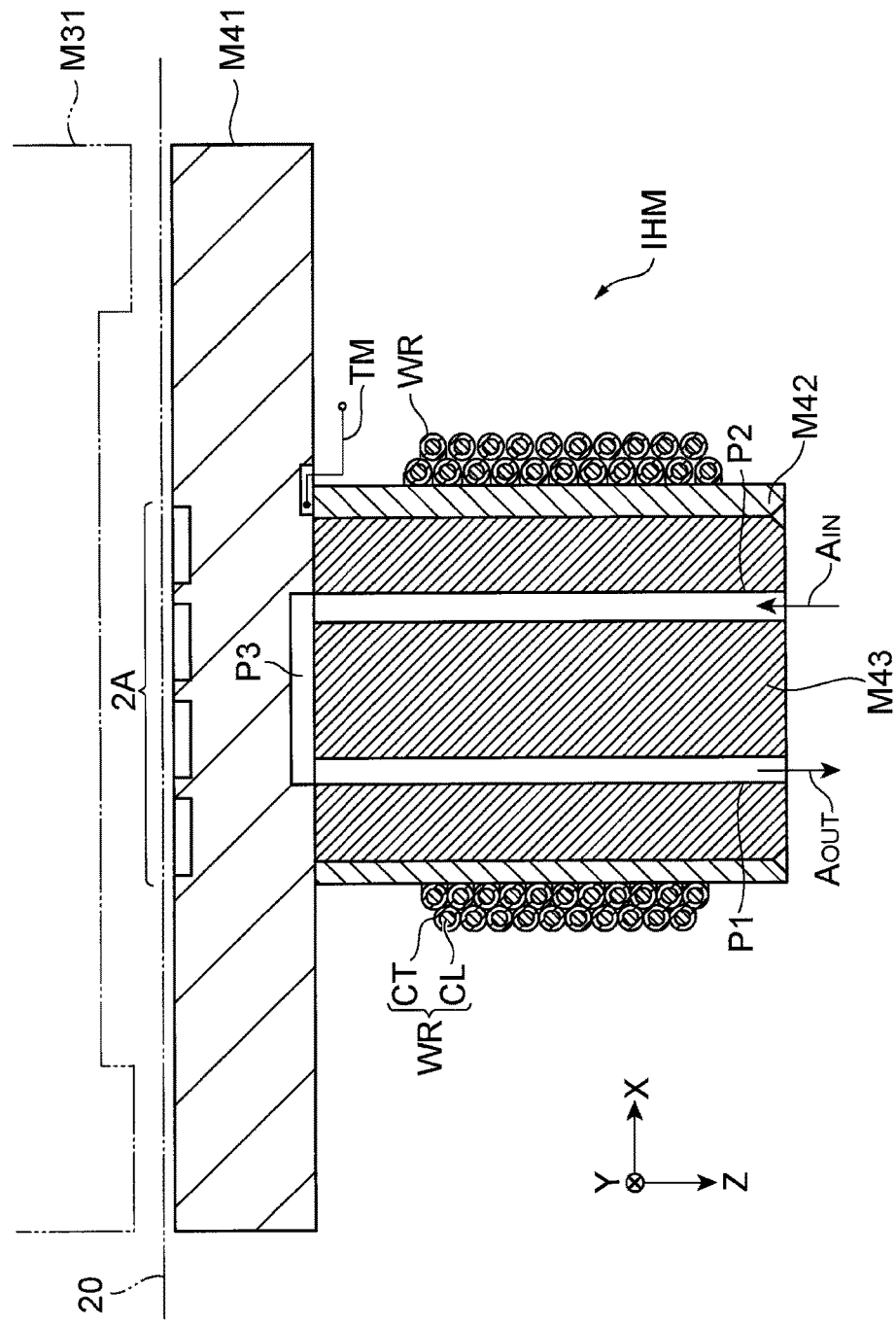
FIG. 3 is a cross sectional view of a heater shown in FIG. 2 taken along arrowed line III-III.
Figure 4:
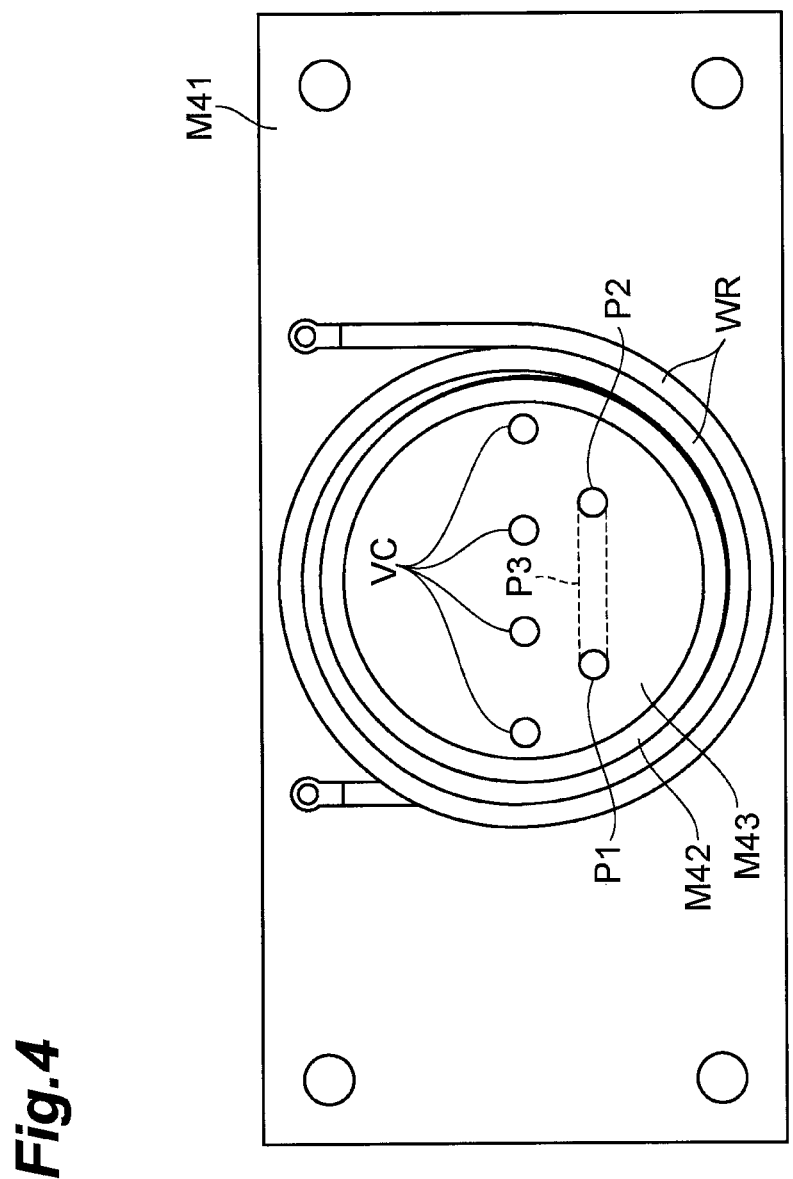
FIG. 4 is a bottom view of a heater shown in FIG. 2 observed from the direction of arrow IV.

FIG. 2 is a perspective view of the heater IHM. FIG. 3 is a cross sectional view taken along arrowed line III-III shown in FIG. 2. FIG. 4 is a bottom view of the heater IHM shown in FIG. 2 observed from the direction of arrow IV.

The heater IHM is a heater for performing high-frequency induction heating, and includes: the top board M41 made of metal; the column member M42 and M43 made of metal and fixed to the top board M41 (refer to FIG. 3); and the coil WR surrounding the column member M42 and M43 relative to the axis thereof (Z axis). A plurality of bolts N1-N4 extend entirely through the top board M41, and by these bolts N1-N4, the top board M41 is secured to the mold situated in the main body side.

The coil WR includes: a conductive wire CL; and an insulation coating layer CT which covers the periphery of the conductive wire CL, wherein Cu can be used as the material of the conductive wire CL, and enamel and silicone can be used as the material of the insulation coating layer CT, but these materials are not limited to such.

When applying current between both terminals WRE1 and WRE2 of the coil WR which is winded such that a tubular form is configured, magnetic field lines are generated in a direction along the axis of the coil WR. The column member (M42) is arranged so that the magnetic field lines may pass through. Being influenced by the magnetic field lines passing through the surface of the column member (M42), an eddy current is generated and high-frequency induction heating is performed.

That is, although areas of the column member neighboring the coil WR (the tubular body M42) need a certain level of high resistance in order to perform high-frequency induction heating, a material of a high resistance usually has a low thermal conductivity and thus it is difficult to increase the temperature of the top board M41 efficiently. The thermal conductivity of the top board M41 is higher than that of an area of the column member neighboring the coil WR (the tubular body M42). As a result, the rate of temperature increase in the top board M41 is improved, and throughput of manufacturing a material being heat-treated by the top board M41 becomes high. This material is a resin in this example.

The column member of the present example includes: the tubular body M42 made of a first metal; and the column part (core member) M43 which is made of a second metal, provided in the tubular body M42, and thermally connected to the tubular body, with its periphery surface being in touch with the inner periphery surface of the tubular body. Here, a resistivity R2 of the second metal is lower than a resistivity R1 of the first metal (R2<R1). That is, although high-frequency induction heating can be performed effectively because the first metal constituting the tubular body M42 is of a high resistance (=R1), the column part M43 inside the tubular body M42 is of a low resistance (=R2), in other words, of a high thermal conductivity, and as a result heat generated in the tubular body M42 will be conducted to the top board M41 effectively via the column part M43. It is also effective for radiating heat of the top board via the column part.

As an example of a preferred combination of materials of each of the top board M41, the tubular body M42 and the column part M43 ($\alpha$, $\beta$, $\gamma$), the followings can be used:

($\alpha$, $\beta$, $\gamma$)=(an alloy tool steel product, a stainless steel product, an aluminum alloy), (an alloy tool steel product, a stainless steel product, a copper alloy), (an alloy tool steel product, a stainless steel product, a zinc alloy), (an alloy tool steel product, a high-speed tool steel product, an aluminum alloy), (an alloy tool steel product, a high-speed tool steel product, a copper alloy), (an alloy tool steel product, a high-speed tool steel product, a zinc alloy), (a carbon steel for machine construction product, a stainless steel product, an aluminum alloy), (a carbon steel for machine construction product, a stainless steel product, an copper alloy), (a carbon steel for machine construction product, a stainless steel product, a zinc alloy), (a carbon steel for machine construction product, a high-speed tool steel product, an aluminum alloy), (a carbon steel for machine construction product, a high-speed tool steel product, a copper alloy), (a carbon steel for machine construction product, a high-speed tool steel product, a zinc alloy), (an alloy tool steel product, an alloy tool steel product, an aluminum alloy), (an alloy tool steel product, an alloy tool steel product, a copper alloy), (an alloy tool steel product, an alloy tool steel product, a zinc alloy), and the like.

This column member has a cooling paths P1 and P2 in its interior. A cooling medium such as air, water, mist air and frozen air can be flowed through the cooling paths P1 and P2. Each of the cooling paths P1 and P2 extends in parallel with the Z axis, and they are connected to each other via a connection path P3 formed in the top board M41. When a cooling medium is introduced in the direction of an arrow $A_{IN}$ from the cooling path P2 that is one of the cooling paths, the cooling medium reaches the cooling path P1 via the connection path P3 and is discharged in the direction of an arrow $A_{OUT}$.

By this, because it becomes possible to cool down the column member at a higher speed than natural cooling, throughput can be improved further. Especially, when the tubular body M42 and the column part M43 are made of different metals and the column part M43 is pressed into the tubular body M42, a distortion will occur in the column member M42 and M43 and the top board M41 fixed to the column member M42 and M43 due to the difference in thermal expansion coefficients between them, but the cooling paths P1 and P2 can absorb a distortion caused by the difference in the thermal expansion coefficients in these metals.

Especially, when the top board M41 is used as a mold for resin molding, it is possible to perform resin molding accurately because a distortion caused by the difference in thermal expansion coefficients does not easily occur.

One of the faces of the column member M42 and M43 perpendicular to the axis direction of the column member M42 and M43 is fixed to the back surface of the top board M41 using welding, bolts and the like, being thermally connected to and making contact with it. Between the back surface of the top board M41 and the column member M42 and M43, there is provided a temperature sensor TM such as a thermocouple so that the temperature sensor TM can measure the temperature of the top board M41.

Note that, the cooling paths P1 and P2 reach the top board M41. By this, the cooling efficiency is improved because a cooling medium flowing through the cooling paths P1 and P2 comes to make a direct contact with the top board M41.

Meanwhile, in this diagram, the recessed pattern 2A is being formed such that four resin packages are produced in a single molding process. That is, the recessed pattern 2A of this example includes four recessed areas 2A1, 2A2, 2A3 and 2A4. At the time of resin molding, in the state that the lead frame 20 is sandwiched by the upper and lower mold major portions M31 and M41, a molten resin is injected into a cavity formed by the upper and lower recessed patterns 2A, and then, a cooling medium is run through the paths P2, P3 and P1, and the resin is cooled down at high speed via the column part M43 and top board M41 which have a high electrical conductivity.

Because this resin molding apparatus is provided with a recessed pattern 2A for resin molding in the top board M41 of the heater IHM, resin molding is made along the recessed pattern 2A. Because the top board M41 is heated and/or cooled at high speed, it is possible to improve throughput at the time of resin molding.

Figure 5:
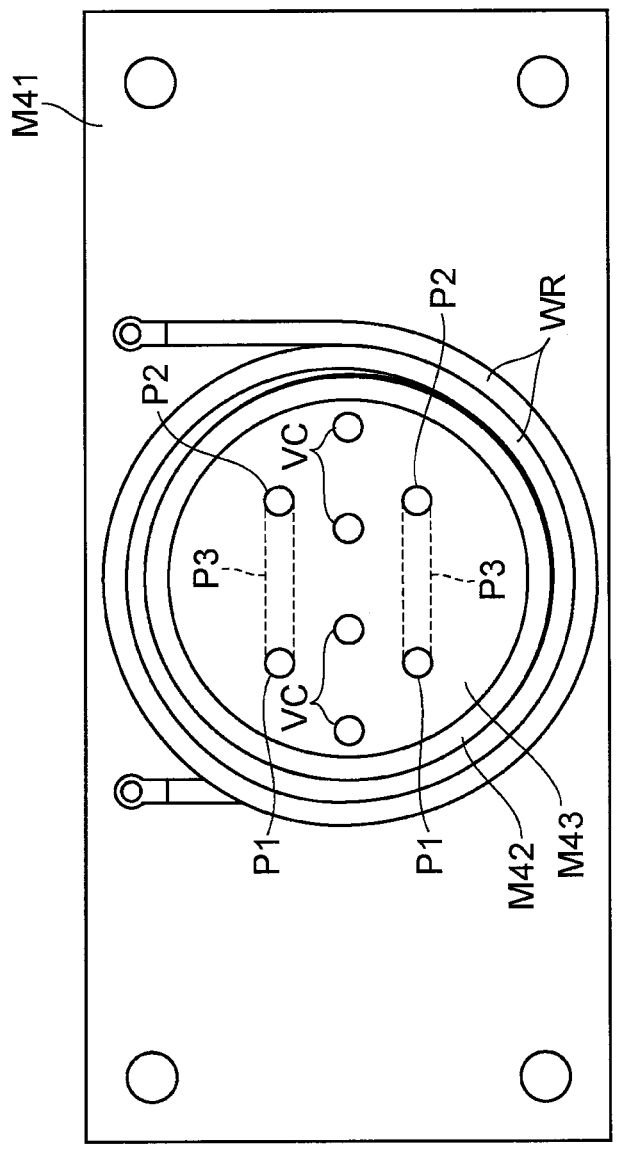
FIG. 5 is a bottom view of a heater.

Although, in FIG. 4, a set of cooling paths P1 and P2 extending in the direction of the Z axis is indicated, two sets or more of cooling paths P1 and P2 may be provided as shown in FIG. 5. Each of the cooling paths P1 and P2 is connected to each other via the communicating path P3.

Figure 6:
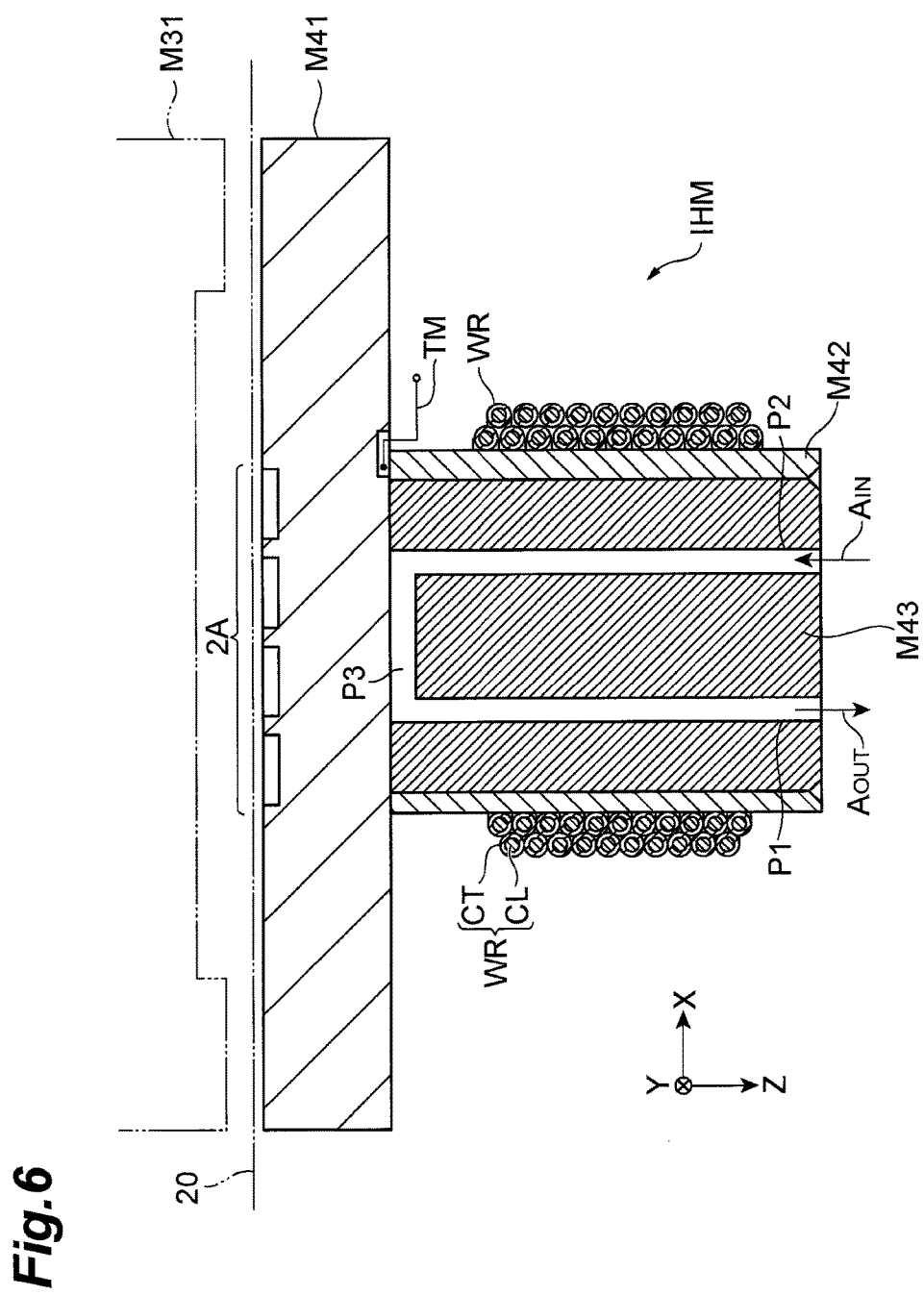
FIG. 6 is a sectional view of a heater.

Further, although, in FIG. 3, it has been arranged such that the connection path P3 is formed in the top board M41, it may be formed in the column part M43 of the column member as shown in FIG. 6. Also in this case, the number of sets of cooling paths and connecting paths may be more than one as shown in FIG. 5.

Meanwhile, it is preferred that the thermal conductivity of the first metal is 60 W/m·K or less and the thermal conductivity of the second metal is 70 W/m·K or more, and in this case, the top board can be heated and/or cooled at a sufficiently high speed. Further, from the viewpoint of high-speed heating, it is preferable that the resistivity of the first metal (=R1) made of a high resistance material is $5 \times 10^{-8}$ Ωm or more.

As a material having a thermal conductivity of 60 W/m·K or less, the followings are known. A carbon steel for machine construction product such as S50C and S55C and their modified steel products; an alloy steel product for machine construction such as SCM440 and SCM445 and their modified steel products; a stainless steel product such as SUS420 and SUS630 and their modified steel products; a carbon tool steel product such as SK3 and their modified steel products; an alloy tool steel product such as SKS3, SKD4, SKD7, SKD11, SKD12, SKD61 and SKT4 and their modified steel products; a high-speed tool steel product such as SKH5, SKH9, SKH51, SKH55, SKH57 and SKH59; and modified steel products such as a powder high-speed steel product and a maraging steel product and the like are included.

On the other hand, as a material having a thermal conductivity of 70 W/m·K or more, the followings are known. Included are: an aluminum alloy such as an aluminum-copper alloy and an aluminum-magnesium alloy; a copper alloy such as a copper-beryllium alloy, a copper-tungsten alloy, a copper-molybdenum alloy and a copper-nickel-tin alloy; and a zinc alloy such as a zinc-aluminum-copper alloy.

Meanwhile, in terms only on the effect of cooling by the cooling operation, the tubular body M42 and the column part M43 may be made of a same sort of material and be configured in a unified manner.

Figure 7:
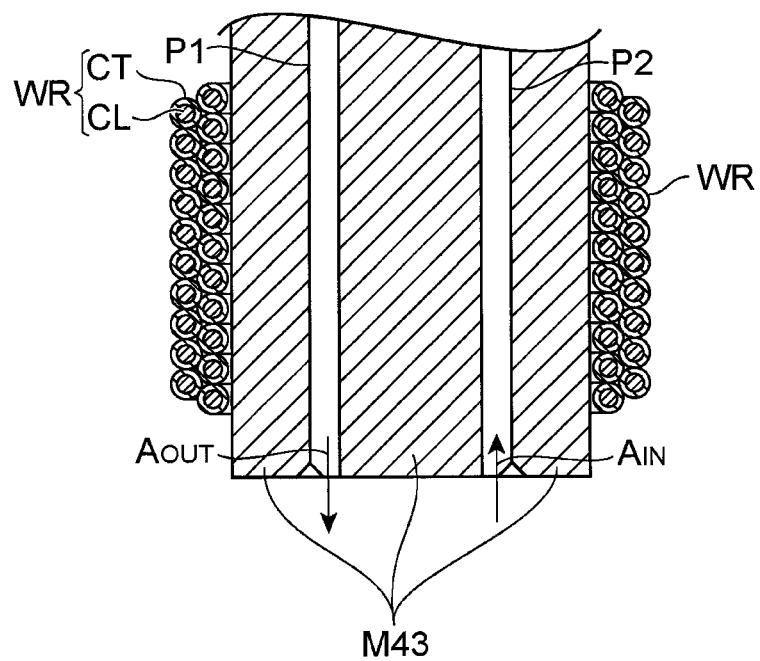
FIG. 7 is a longitudinal cross-sectional view of a column member.

FIG. 7 is a longitudinal cross-sectional view of a column member when the entire column member consists of a material the same as the aforementioned tubular body M43. For convenience of explanation, the column member is indicated by a symbol identical to that of the tubular body M43.

The same material as the above mentioned tubular body M43 can be used in the column member (M43), and, in its interior, cooling paths P1 and P2 are formed. Also in this case, by energization of the coil WR, it is possible to apply high-frequency induction heating to the column member (M43) and to heat the top board M41 thermally connected to the column member (M43) via the column member (M43) at a high speed, and, in addition, by the column member (M43) having the cooling paths P1 and P2 as described above, it is possible to cool down the column member (M43) and the top board M41 at a high speed. As a result, manufacturing throughput can be improved.

Figure 8:
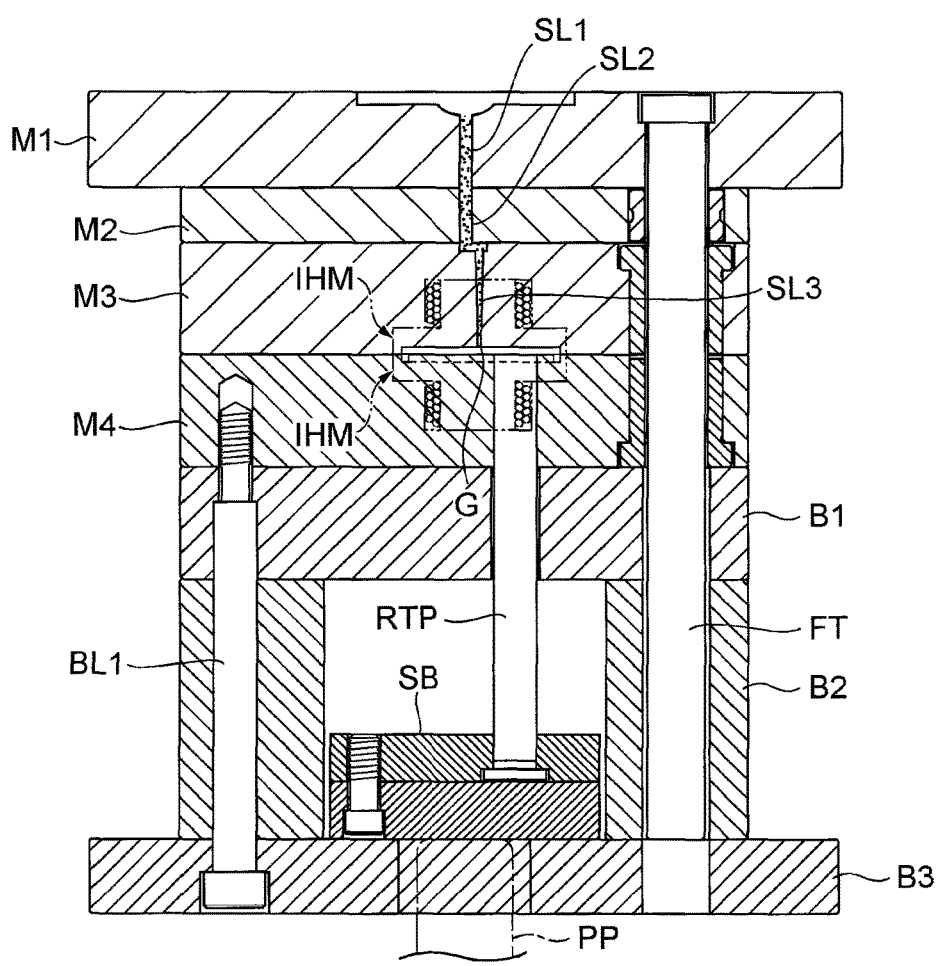
FIG. 8 is a longitudinal cross-sectional view of a resin molding apparatus including an upper and lower molds.

FIG. 8 is a longitudinal cross-sectional view of a resin molding apparatus including an upper and lower molds.

A base platforms B2 and B1 are mounted on a base B3, and they are being fixed to each other by a bolt BL1. Over the upper base platform B1, the lower mold M4 and the upper mold M3 are mounted. In the upper mold M3, a resin supply path SL3 leading to the gate G is formed. Further, in the lower resin supply member (mold) M2 and the upper resin supply member (mold) M1 mounted on the upper mold M3, a resin supply path SL2 and a resin supply path SL1 which lead to the resin supply path SL3 are formed, respectively.

First, in the state that all of the molds M1-M4 are closed, a resin material is injected into a space between the upper mold M3 and the lower mold M4 via resin supply paths (a spool and a runner) SL1, SL2 and SL3 and the gate G. The resin is melted, and the upper mold M3 and the lower mold M4 have been heated by the aforementioned heater IHM. In each of them, there is provided the top board M41 to which the recessed pattern 2A is formed (refer to FIG. 2), and the top board M41s of them are facing each other. Just before the upper and lower molds M3 and M4 close entirely, the above mentioned exhaust is started, and once injection of the resin is completed, the exhaust is stopped and a cooling medium is introduced to the cooling paths P1 and P2 of each of the molds to solidify the resin.

Next, along with a guide pin FT, the molds M1 and M2 are separated from the mold M3, and the solidified resin (spool runner) leading to the gate G is cut off from the resin molded body (the case body 2A) molded within the cavity. The guide pin FT extends through the molds M1, M2, M3 and M4, and base platforms B1 and B2 in the thickness direction. In the hole which the guide pin FT extends through, a sleeve for facilitating slide of the guide pin FT against the molds is provided, and the guide pin FT can travel in the upper and lower directions while sliding on the inner surface of the sleeve. The upper end of the guide pin FT is fixed to the mold M1.

Next, the upper mold M3 is separated from the lower mold M4, and the resin molded body (the case body 2A) molded in the cavity between the molds stays behind on the lower mold M4.

Further, the mold M2 is separated from the mold M1, and the above-described spool runner is pulled out from the mold M1, enabling the spool runner to be easily removed. After that, by projecting an ejection pin PP of the mold machine from the lower side of an insertion opening formed in the base B3, the end of the ejection pin PP pushes the bottom surface of an ejector plate SB upward, and the ejector plate SB moves upward sliding on the inner surface of the base platform B2. A return pin RTP extending upward is fixed to the ejector plate SB. The return pin RTP reaches the bottom surface of the mold M3 through the through-hole of the base platform B1 and the through-hole of the mold M4. When the ejector plate SB is slid upward to knock up the return pin RTP, an ejector pin which is connected to the return pin RTP and which moves upward in conjunction with this move (not illustrated) projects the resin molded body (the case body 2A) upward.

When the molds M1-M4 are closed, the end of the return pin RTP which is projected is pushed downward by the bottom surface of the upper mold M3, and, in conjunction with this, the above mentioned ejector pin (not illustrated) returns to the original position. Because the end of the ejector pin is not pushed in the state it is in contact with the upper mold M3, deterioration of its surface can be prevented. Meanwhile, the above mentioned resin molding apparatus can be configured as a transversal type so that a move of upward/downward directions can be changed to a move of a horizontal directions.

Figure 9:
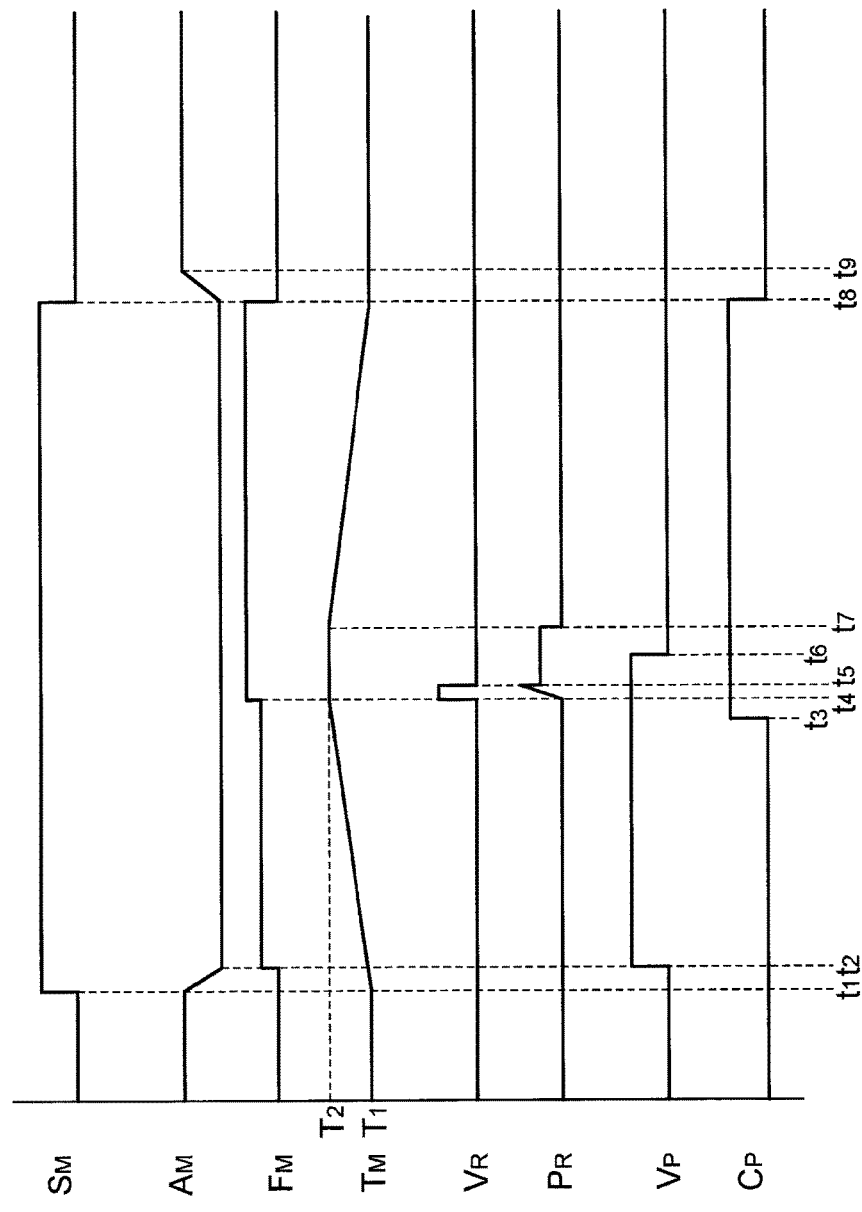
FIG. 9 is a timing chart at the time of resin molding.

FIG. 9 is an example of a timing chart at the time of resin molding.

A time period during when mold clamping is performed is indicated by a high level of a signal $S_M$, the time period starting from time $t_1$ when movement of closing the upper and lower molds starts. The amount of opening between the upper and lower molds (separation) is indicated by $A_M$. After the time $t_1$, the amount of opening $A_M$ is reduced, and the molds are closed gradually. After the time $t_1$, heating of the upper and lower molds is started using the above mentioned heater, and the temperature of the molds $T_M$ increases gradually. Although, at the time $t_2$, the amount of opening $A_M$ becomes 0 and the upper and lower molds make contact with each other, a some amount of pressure $F_M$ is applied to the contacting surfaces of these molds (top board) from the time $t_2$ to time $t_4$.

At the time $t_2$, an amount of exhaust $V_P$ is set to a positive number to start the above mentioned exhaust, and after that, at time $t_6$, the exhaust is stopped. From time $t_3$, an introduction speed $C_P$ of a cooling medium to the cooling path is made be a positive number to start introduction of the above mentioned cooling medium, and after that, at time $t_8$, the introduction is ended.

At time $t_4$ when the temperature $T_M$ of the upper and lower molds reaches a desired temperature, the pressure $F_M$ for mold clamping is increased, and during the time $t_4$ to time $t_5$, a resin is injected into the cavity between the molds at an injection speed $V_R$ of a positive number. A resin injection pressure $P_R$ increases rapidly between the time $t_4$ and time $t_5$, and after that, the pressure $P_R$ is lowered a little until time $t_7$, and it becomes 0 at time $t_7$.

Once the temperature of the molds $T_M$ is lowered sufficiently, the mold clamping period is ended at the time $t_8$, and the amount of opening $A_M$ of the molds is increased and the pressure $F_M$ between the molds is made 0. After that, at time $t_9$, the molds are opened completely and a single molding process is finished.

Meanwhile, introduction of a cooling medium may be started at the time $t_7$ when temperature of the upper and lower molds $T_M$ reaches a desired temperature, or may be started at a time point between the time $t_3$ and time $t_7$. Among these time points, in order to improve throughput, it is preferred to start from the time $t_3$. Also, about stopping a cooling medium, although it should simply be stopped by the time when the next molding process begins, in order to improve throughput, it is preferred to stop it at the time $t_8$.

Next, a number of experiments were performed using a heater having the structure shown in FIG. 3.

(Common Conditions)

As common conditions, a heater was secured to a peripheral mold made of stainless steel (S45C: JIS specification). The temperature of this peripheral mold is being maintained at 100° C. This corresponds to temperature measurement in the state that molds are opened. A material of the top board, the tubular body and the column part were changed from example 1 to example 5, respectively, and a heat-up time needed from when the top board temperature reached 250° C. to when it reached 300° C. after heating by a heater was started was measured. The top board was a plate-like cuboid having the size of 60 mm in width, 100 mm in length and 4.5 mm in thickness; the tubular body of a tubular form was 44 mm in diameter, 34 mm in inner diameter and 30 mm in height; the column part of a columnar form was 34 mm in diameter and 30 mm in height; and the length of the cooling path of a tubular form in the column part was 34 mm and its inner diameter was 5 mm.

Meanwhile, ACD37 is an alloy tool steel product made by Hitachi Metals, Ltd., MOLDMAX HH is a copper-beryllium alloy (Cu: 98.2%, Be: 1.8%) treated by BRUSH WELLMAN JAPAN Ltd., and S-STAR is a stainless alloy made by Daido Steel Co., Ltd.

EXAMPLE 1

Top board=ACD37 (thermal conductivity: 42 W/m·K)
Tubular body=ACD37 (thermal conductivity: 42 W/m·K)
Column part=ACD37 (thermal conductivity: 42 W/m·K)

EXAMPLE 2

Top board=ACD37 (thermal conductivity: 42 W/m·K)
Tubular body=ACD37 (thermal conductivity: 42 W/m·K)
Column part=MOLDMAX HH (thermal conductivity: 105 W/m·K)

EXAMPLE 3

Top board=S-STAR (thermal conductivity: 23 W/m·K)
Tubular body=S-STAR (thermal conductivity: 23 W/m·K)
Column part=S-STAR (thermal conductivity: 23 W/m·K)

EXAMPLE 4

Top board=ACD37 (thermal conductivity: 42 W/m·K)
Tubular body=S-STAR (thermal conductivity: 23 W/m·K)
Column part=S-STAR (thermal conductivity: 23 W/m·K)

EXAMPLE 5

Top board=ACD37 (thermal conductivity: 42 W/m·K)
Tubular body=S-STAR (thermal conductivity: 23 W/m·K)
Column part=MOLDMAX HH (thermal conductivity: 105 W/m·K)

The heat-up times needed to heat up from 250° C. to 300° C. were as follows.
EXAMPLE 1 . . . 30 sec
EXAMPLE 2 . . . 15 sec
EXAMPLE 3 . . . 45 sec
EXAMPLE 4 . . . 37 sec
EXAMPLE 5 . . . 17 sec

COMPARATIVE EXAMPLE 1

When, as comparative example 1, a cooling path was not included and a cuboidal block having the size of 250 mm×60 mm×30 mm made of S-STAR was heated by a heater (Output 3 kW), the heat-up time needed to heat up from 250° C. to 300° C. was as follows.

COMPARATIVE EXAMPLE 1 . . . 80 sec

The temperature rising characteristic of the heaters of the above-mentioned examples 1-5 is superior to that of the comparison example 1.

EXAMPLE 6

The temperature of the peripheral molds M4, M3 to which the top boards M41, M31 shown in FIG. 1 were connected thermally was kept at 100° C., and the heater of the example 3 was installed to each of the molds M4 and M3.

A high-frequency current is applied to the coil of the both heaters, and the temperature of the top board was kept at 252° C. After placing a lead frame which was made of copper and to which blackening treatment had been applied in a cavity between the molds ($t_1$=0 sec), the temperature of the top board was increased by high-frequency induction heating while clamping the molds. Next, after starting exhausting the inside of the cavity by a vacuum pump ($t_2$=2 sec), air was introduced into the cooling path as a cooling medium ($t_3$=22 sec). At the time when the top board temperature had reached 300° C., a melted liquid crystal polymer (Sumitomo Chemical Co., Ltd: E6008, flow starting temperature: 320° C.) was filled into the cavity ($t_4$=23 sec). At the time point when the top board temperature reached 252° C., supply of the cooling medium was stopped and the molded resin molded body was taken out from the mold. In this case, a time period from when placing the lead frame to when taking-out the molded body was 57 sec.

Figure 10:
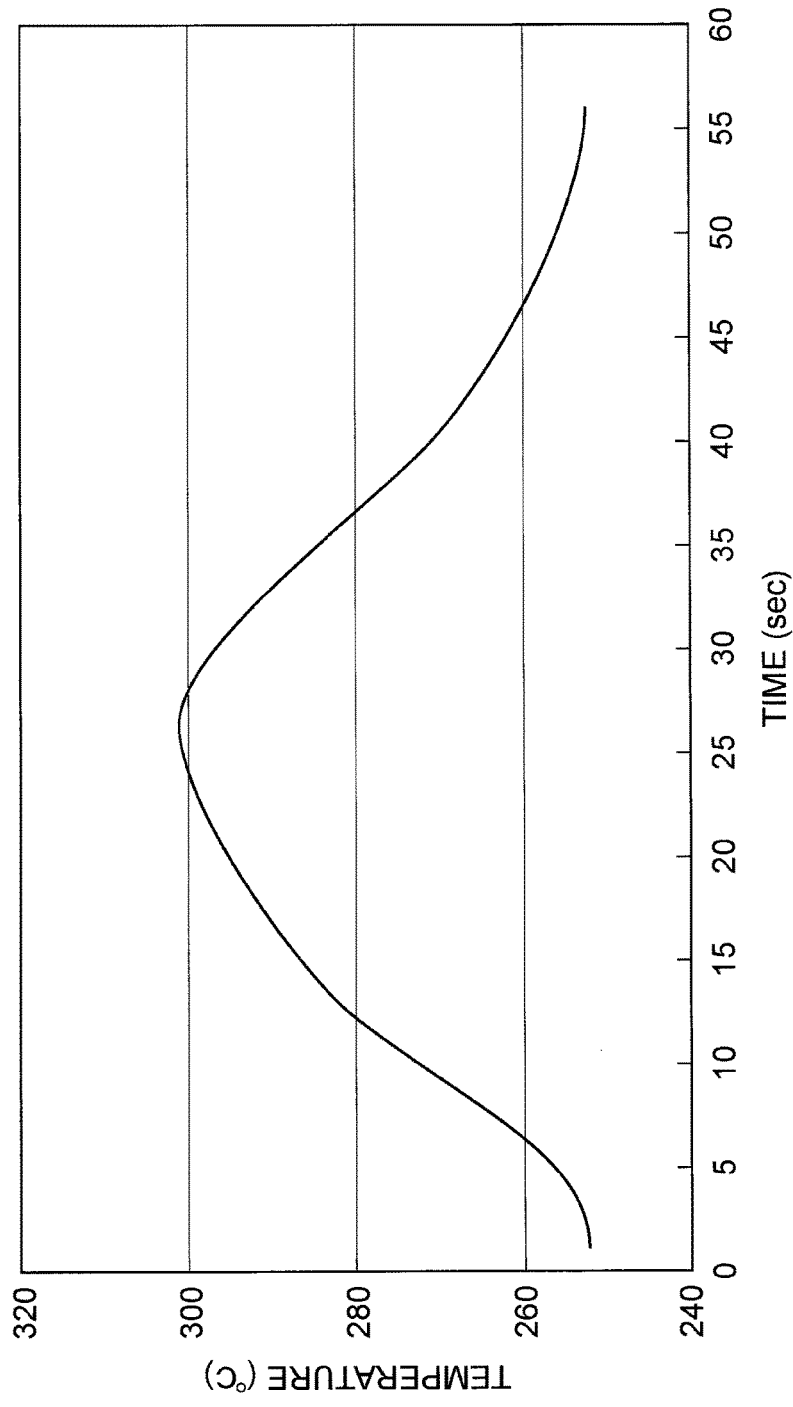
FIG. 10 is a graph of a heat cycle.

FIG. 10 is a graph of a heat cycle of this example.

The temperature of the top board was able to be increased to 300° C. from 252° C. in 23 sec after the start of heating by the heater, and, by introducing the cooling medium, the top board temperature was able to be decreased to a given value of 252° C. in 29 sec. More specifically, it was an excellent characteristic that a rate of temperature increase $T_{UP}$ (° C./s) was about 2 (° C./s), and a rate of temperature decrease $T_{DOWN}$ (° C./s) was about −2 (° C./s). These are a rate of temperature increase and a rate of temperature decrease more excellent than those achieved by resistance heating and natural cooling.

COMPARATIVE EXAMPLE 2

In the case where resin molding the same as the example 6 was carried out without supplying the cooling medium, the time period after placing the lead frame until taking-out the molded body was 82 sec.

EXAMPLE 7

The temperature of the peripheral molds M4, M3 to which the top boards M41, M31 shown in FIG. 1 were connected thermally was kept at 100° C., and the heater of the example 2 was installed to each of the molds M4 and M3. A high-frequency current is applied to the coil of the both heaters, and the temperature of the top board was kept at 253° C. After placing a lead frame which was made of copper and to which blackening treatment had been applied in a cavity between the molds ($t_1$=0 sec), the temperature of the top board was increased by high-frequency induction heating while clamping the molds. Next, after starting exhausting the inside of the cavity by a vacuum pump ($t_2$=2 sec), air was introduced into the cooling path as a cooling medium ($t_3$=20 sec). At the time when the top board temperature reached 300° C., a melted liquid crystal polymer (Sumitomo Chemical Co., Ltd.: E6008, flow starting temperature: 320° C.) was filled into the cavity ($t_4$=21 sec). After supply of the cooling medium was stopped ($t_8$=28 sec), at the time point when the top board temperature had reached 253° C., the molded resin molded body was taken out from the mold. In this case, a time period after placing the lead frame until taking-out the molded body was 32 sec.

Figure 12:
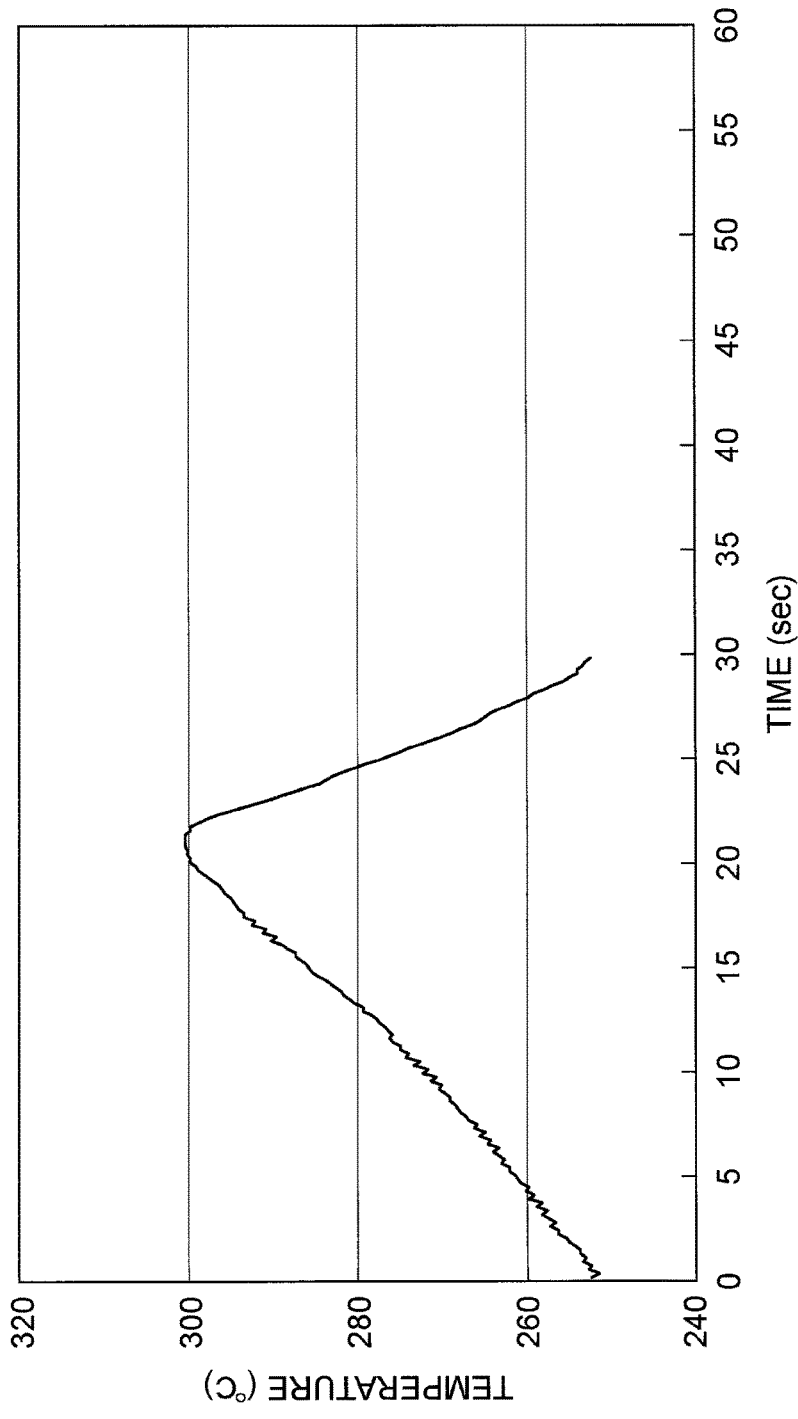
FIG. 12 is a graph of a heat cycle according to another embodiment.

FIG. 12 is a graph of a heat cycle of this example.

The temperature of the top board was able to be increased to 300° C. from 253° C. in 21 sec after the start of heating by the heater, and, by introducing the cooling medium, the top board temperature was able to be decreased to a given value of 253° C. in 9 sec. More specifically, it was an excellent characteristic that a rate of temperature increase $T_{UP}$ (° C./s) was about 2 (° C./s), and a rate of temperature decrease $T_{DOWN}$ (° C./s) was about −5 (° C./s). These rate of temperature increase and rate of temperature decrease are more excellent than those achieved by resistance heating and natural cooling.

COMPARATIVE EXAMPLE 3

In the case where resin molding the same as the example 7 was carried out without supplying the cooling medium, a time period after placing the lead frame until taking-out the molded body was 48 sec.

As described above, it has been proved that a top board can be heated up faster by using a heater having the above mentioned structure and a cooling time can be shortened sufficiently by using a cooling path, thus enabling improving throughput. In particular, it has been proved that, by arranging such that the thermal conductivity of the top board is larger than that of the tubular body like the example 2, the example 4 and the example 5, or such that the column part is made up of a material having a thermal conductivity of 70 W/m·K or more, the heat-up time can be significantly improved. In addition, when the thermal conductivity of the first metal which makes up the tubular body is 60 W/m·K or less, it is possible to make its resistivity larger, enabling high-frequency induction heating of a sufficiently high speed.

The above mentioned resin includes a thermosetting resin and a thermoplastic resin. As a thermosetting resin, a phenol resin, a urea resin, a melamine resin, a diallyl phthalate resin, an epoxy resin, a polyurethane resin, a polyimide resin and an unsaturated polyester resin can be shown as an example, and a phenol resin and an epoxy resin are preferably used.

Similarly, as a thermoplastic resin, a polystyrene resin, an acrylate resin, a polycarbonate resin, a polyester resin, a polyamide resin, a polyacetal resin, a polyphenylene ether resin, a fluorine resin, a polyphenylene sulfide resin, a polysulphone resin, a polyarylate resin, a polyetherimide resin, a polyethersulfone resin, a polyetherketone resin, a liquid crystalline polyester resin, a polyamide-imide resin, a polyimide resin can be shown as an example; a polyester resin, a polyamide resin, a polyphenylene sulfide resin, a liquid crystalline polyester resin are preferably used; and from a viewpoint of being superior in flowability, heat resistance and stiffness, a liquid crystalline polyester resin (liquid crystalline polymer) is most preferably used. These resins may be used by itself, or a plurality of resins may be used all together.

The resin molding method described above includes: a step of injecting a resin into a mold of the above mentioned resin molding apparatus; and a step of cooling the mold, wherein the resin is a thermoplastic resin, wherein a coil is energized, and when a temperature of the mold when injecting the resin into the mold is T1 (° C.) and a flow starting temperature of the resin is T2 (° C.), the following expression is satisfied:

$$T1(° C.) \geq T2(° C.)-70° C.$$

When a resin is injected at such a temperature, the resin sufficiently flows within the mold and a resin molded body of fine appearance can be formed.

Further, let T3 (° C.) be the temperature of the mold at the time of separating a resin molded body from the mold following cooling down of the mold, it is further preferable to satisfy the following relational expression.

$$T3(° C.) \leq T2(° C.)-100° C.$$

By this, because it is possible that the resin molded body is separated from the molds easily, manufacturing throughput can be improved further. Meanwhile, in both of the cases where a lead frame as an insert part is inserted and not inserted, the same effect as when the condition of the above mentioned temperature range is satisfied can be obtained.

Figure 11:
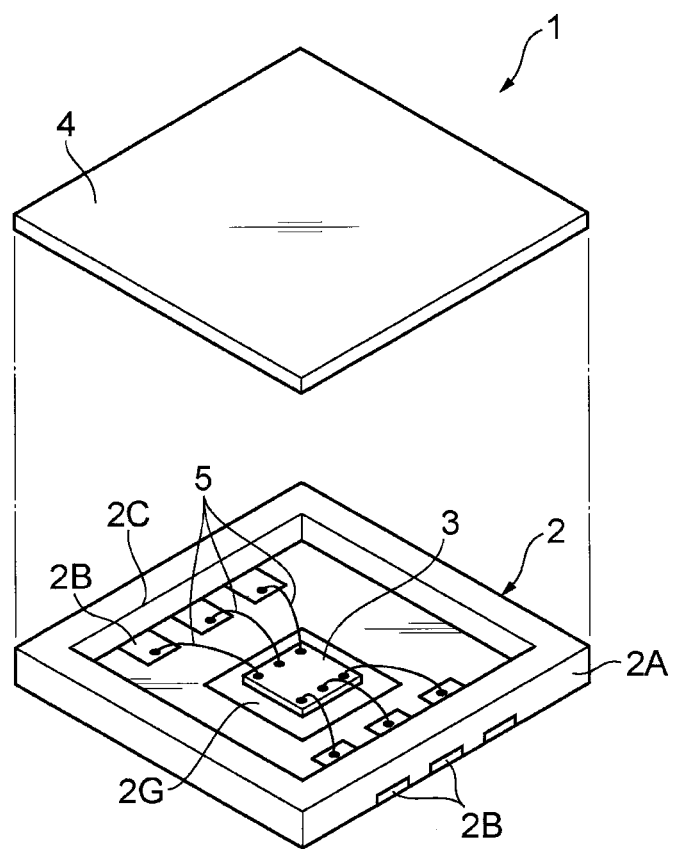
FIG. 11 is a perspective view of an electronic component having a resin molded body manufactured.

FIG. 11 is a perspective view of an electronic component having a resin molded body manufactured.

An electronic component 1 includes a resin case 2 and a cap member 4. The resin case 2 includes a resin case body 2A that is the above mentioned resin molded body, and the resin case body 2A has a recessed part 2C in its center. From a lead frame, a die pad 2G and lead terminal 2B are clipped. That is, in the above mentioned process, a lead frame (2G, 2B) is inserted between the molds (M31, M41: refer to FIG. 1) as an insert part, and in this state a resin is injected between the molds and then this resin is solidified. In the recessed part 2C of the resin case body 2A, the die pad 2G is allocated, and an electronic device 3 is secured on the die pad 2G. The electronic device 3 is connected with an inner lead of the lead terminal 2B via a bonding wire 5. The lead terminal 2B is being exposed to outside in the back surface of the case body 2A, enabling flip chip bonding. The cap member 4 is secured on the open end of the resin case body 2A, and the inside of the recessed part 2C is made airtight.

Meanwhile, the above mentioned resin preferably is a thermoplastic resin and a liquid crystalline polymer. A liquid crystalline polymer can flow within a mold sufficiently. In comparison with a resin molded body manufactured by an existing method, a resin molded body manufactured by the above mentioned resin molding method has a difference that, in terms of its structure, it has a superior appearance in which there is observed few welds caused by resin flows running into each other and, in addition, a flow mark is extremely small and so on.

Further, when a resin is injected in a mold which sandwiches as an insert part: a lead frame made of copper, iron, nickel, cobalt, aluminum, zinc or their alloys; a metal part; and a ceramic, at a relatively high temperature, there is an advantage that the adhesiveness between the resin and the lead frame, the metal part and the ceramic is improved.

In order to further improve the adhesiveness with a resin, it is preferred that the surface of the insert part is processed by blackening treatment or roughening treatment. A method of blackening treatment includes: a method to soak an insert part in an alkaline water solution (for example, a water solution prepared by dissolving a sodium chlorite, a sodium hydroxide and trisodium phosphate in water); a method to soak an insert part in an alkaline water solution (for example, a water solution prepared by dissolving a sodium chlorite, a sodium hydroxide and trisodium phosphate in water) to anodize the lead frame; and a method to soak an insert part in an electrodeposition solution including a second copper ion (for example, a water solution prepared by dissolving a copper sulfate, a lactic acid and sodium hydroxide in water) and to energize the insert part. Also, a method for roughening a surface includes: a sandblast method of a dry or wet type; a water jet method; a press method; a laser radiation method; and a method of etching by an acidic or alkaline etchant (for example, Mold Prep LF made by ATOTEC Japan, Ltd.).

(Airtightness Test)

EXAMPLE 8

An airtightness test was performed using the resin case body 2A manufactured in the above mentioned example 6.

Figure 13:
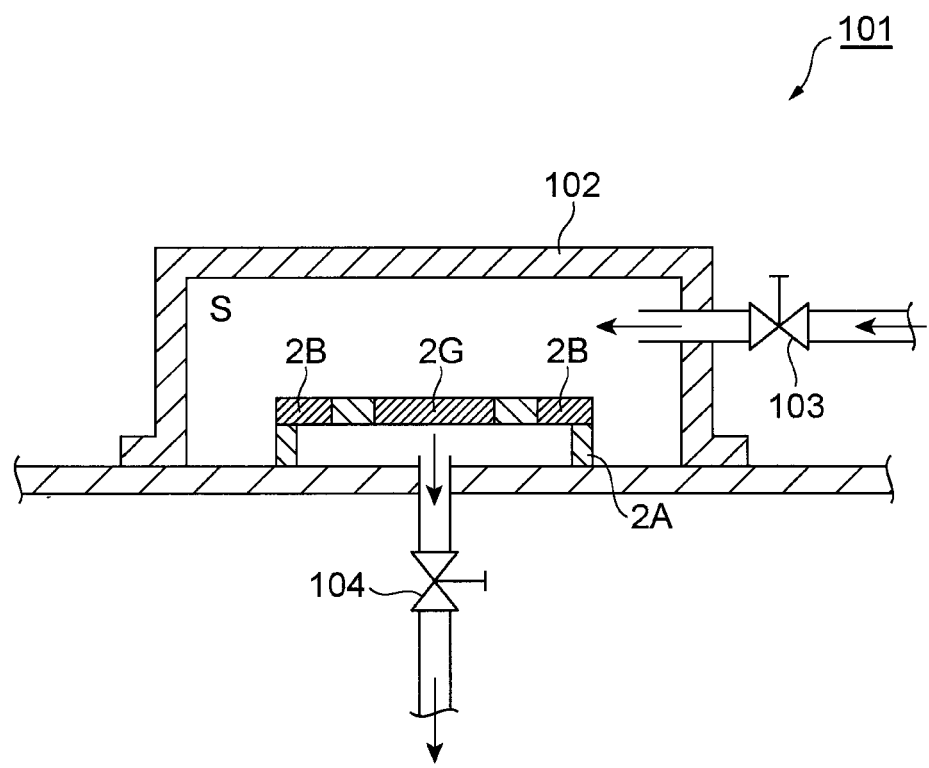
FIG. 13 is a schematic diagram showing an airtightness test apparatus 101.

FIG. 13 is a schematic diagram showing the air tightness test apparatus 101 used in the air tightness test. As shown in FIG. 13, the air tightness test apparatus 101 includes: a chamber 102, a gas supplying part 103 that supplies an inactive He gas into the chamber 102; and a gas exhausting part 104 that exhausts the air in the chamber 102 from the bottom surface of the chamber 102.

First, the above-mentioned resin case body 2A was made upside down, and the resin case body 2A was placed such that the side walls of the resin case body 2A surrounds the gas exhausting part 104 in the bottom surface of the chamber 102. After that, air of a space S formed by the side walls of the resin case body 2A and the chamber 102 was exhausted by the gas exhausting part 104 and thus the resin case body 2A was fixed to the bottom surface of the chamber 102. Next, He was introduced into the chamber 102 via the gas supplying part 103, and airtightness of the resin case body 2A was tested by detecting He in the gas exhausting part 104.

Let $\alpha_0$ be the number of the resin case body 2As tested, and $\alpha$ be the number of the resin case body 2As showing an He leakage value of less than $1\times10^{-8}$ Pa·m$^3$/sec, airtightness is given by $\alpha/\alpha_0 \times 100\%$. The higher the value of airtightness, the more excellent airtightness it means. As a result of the measurement, the airtightness was 100%.

EXAMPLE 9

Molding of the resin case body 2A was performed similarly to the example 6 except for changing the top board temperature to 281° C. The airtightness of this resin case body 2A was 92%.

EXAMPLE 10

Molding of the resin case body 2A was performed similarly to the example 6 except for changing the top board temperature to 269° C. The airtightness of this resin case body 2A was 73%.

COMPARATIVE EXAMPLE 4

Molding of the resin case body 2A was performed similarly to the example 6 except for changing the top board temperature to 240° C. The airtightness of this resin case body 2A was 0%.

EXAMPLE 11

Molding of the resin case body 2A was performed similarly to the example 6 except for using a lead frame to which roughening treatment using Mold Prep LF made by ATO-TEC Japan, Ltd. was performed. The airtightness of this resin case body 2A was 87%.

INDUSTRIAL APPLICABILITY

The present invention can be applied for a heater, a resin molding apparatus, a resin molding method which can improve manufacturing throughput by performing heating and cooling at a high speed, and a resin molded body.

The invention claimed is:

1. A molding apparatus heater comprising:
   a top board made of metal;
   a column member made of metal, said top board being fixed to a top end of the column member, the top board being thermally connected to the column member such that heat generated in the column member is conducted to the top board, the column member including a cooling path in its interior, the column member comprising:
   a tubular body made of a first metal, and
   a core member made of a second metal and provided in the tubular body, the core member extending along an entire length of the tubular body while an outer periphery surface of the core member is in contact with an inner periphery surface of the tubular body, a thermal conductivity of the second metal being higher than a thermal conductivity of the first metal, a thermal conductivity of the top board being higher than the thermal conductivity of the first metal; and
   a coil surrounding the tubular body of said column member relative to an axis thereof.

2. The heater according to claim 1, wherein said cooling path is provided in said core member.

3. The heater according to claim 1, wherein the thermal conductivity of said first metal is 60 W/mK or less, and wherein the thermal conductivity of said second metal is 70 W/mK or more.

4. A molding apparatus heater comprising:
   a top board made of metal and having a first surface and an opposing second surface, the first surface including a recessed pattern configured to receive a resin to be molded;
   a column member made of metal, said second surface of the top board being fixed to a top end of the column member, the top board being thermally connected to the column member such that heat generated in the column member is conducted to the top board, the column member including a cooling path in its interior, the column member comprising:
   a tubular body made of a first metal, and
   a core member made of a second metal and provided in the tubular body, the core member extending along an entire length of the tubular body while an outer periphery surface of the core member is in contact with an inner periphery surface of the tubular body, a thermal conductivity of the second metal being higher than a thermal conductivity of the first metal, a thermal conductivity of the top board being higher than the thermal conductivity of the first metal; and
   a coil surrounding the tubular body of said column member relative to an axis thereof.

5. The heater according to claim 4, wherein said cooling path is provided in said core member.

6. The heater according to claim 4, wherein the thermal conductivity of said first metal is 60 W/mK or less, and wherein the thermal conductivity of said second metal is 70 W/mK or more.

* * * * *